United States Patent [19]
Markovitz et al.

[11] Patent Number: 5,314,984
[45] Date of Patent: May 24, 1994

[54] HEAT RESISTANT RESIN COMPOSITIONS, ARTICLES AND METHOD

[75] Inventors: Mark Markovitz, Schenectady; Jeffrey D. Sheaffer, Scotia, both of N.Y.

[73] Assignee: General Electric Company, Schenectady, N.Y.

[21] Appl. No.: 14,046

[22] Filed: Feb. 5, 1993

Related U.S. Application Data

[63] Continuation of Ser. No. 629,155, Dec. 18, 1990, abandoned.

[51] Int. Cl.⁵ .............................................. C08G 65/00
[52] U.S. Cl. ...................................... 528/117; 528/94; 528/96; 525/486; 525/510; 525/511; 525/528; 525/929
[58] Field of Search ............... 525/486, 510, 511, 528, 525/929, 94, 96, 117

[56] References Cited

U.S. PATENT DOCUMENTS

| | | | |
|---|---|---|---|
| 4,283,521 | 8/1981 | Jones | 528/117 |
| 4,288,359 | 9/1981 | Graham | 528/117 |
| 4,510,272 | 4/1985 | Loszewski | 528/94 |
| 4,816,531 | 3/1989 | Young | 528/117 |
| 5,021,519 | 6/1991 | Varde et al. | 528/94 |
| 5,081,167 | 1/1992 | Jackson | 528/94 |

OTHER PUBLICATIONS

Academic Press, p. 331–Rudin, 1982.
Academic Press, pp. 86, 87–Goethals, 1984.

*Primary Examiner*—John C. Bleutge
*Assistant Examiner*—Randy Gulakowski
*Attorney, Agent, or Firm*—Robert C. Lampe, Jr.; James F. McGinness; Charles T. Watts

[57] ABSTRACT

Low viscosity, solventless, thermosetting resin compositions of bismaleimide resin composition and epoxy resins have unique heat stability and special utility as insulation for electric conductors to be used in the 200°–250° C. temperature range.

11 Claims, 1 Drawing Sheet

HEAT RESISTANT RESIN COMPOSITIONS, ARTICLES AND METHOD

This application is a continuation of application Ser. No. 07/629,155, filed Dec. 18, 1990, now abandoned.

FIELD OF THE INVENTION

This invention relates generally to epoxy resin technology and is more particularly concerned with novel thermosetting resin compositions of low viscosities, good electrical properties and high heat resistance composed of bismaleimide resin compositions and epoxy resin compositions, and is also concerned with electrical conductors insulated with these compositions, and with the method of producing those insulated conductors.

BACKGROUND OF THE INVENTION

The solventless resin compositions of U.S. Pat. No. 4,603,182 have special merit as electrical insulation materials because of their low viscosity and their stability at elevated temperatures, both of which favor the use of vacuum-pressure impregnation technique in the production of insulated conductors. While those compositions have consequently seen extensive use in insulation applications and, in fact, have qualified for use in service at temperatures as high as 220° C., there persists a well-recognized need for vacuum-pressure impregnatable (VPI) resin compositions for electrical insulating purposes at temperatures up to in the 220°–250° C. range for protracted periods. The numerous attempts to produce such heat stable VPI resins have taken a variety of forms, but all have failed for one reason or another to satisfy the demand. Addition of inorganic oxides and silica, for instance, has proven to be of very little benefit. Thus, lamellar silica enhances thermal stability beyond such other inorganic materials but substantially increases viscosity of VPI resins, detracting from their usefulness.

Various heat resistant polymers such as polyimides, fluoro silicones, polyphenylsulfide and the like are useful as films, molded parts and wire enamels but cannot be used at VPI resins for insulating electrical machinery nor can they be used to impregnate mica paper to make prepregged mica tapes. Liquid enamels made with high temperature polyimide polymers usually contain less than 15% solids and, in addition, a volatile compound is generated during cure. Polyimides, such as KAPTON TM find uses in heat resistant electrical insulation as films but cannot be used as VPI resins for reasons set out above.

None of the commercially-available heat resistant VPI resins which we have tested is more heat stable than those of U.S. Pat. No. 4,603,182 referenced above.

SUMMARY OF THE INVENTION

By virtue of the present invention, which is based upon our surprising discovery set forth below, it is now possible for the first time to meet to and satisfy the aforesaid demand. Thus, resin compositions of this invention possess undiminished the important properties of prior art VPI resins and yet have significantly greater heat resistance than any of them. Moreover, these new resin compositions are easily and economically produced and used to provide insulated conductors for service in motors and generators operating in the 220°–250° temperature range.

In making this invention we discovered that resins which have excellent heat resistance, but are solids at 25° C., can be used under certain circumstances to produce low temperature solventless VPI compositions. Specifically, we found that the heat stability of the epoxy resin compositions of the −182 patent can be increased enough to meet the special needs set out above by adding a bismaleimide resin composition. Vinyl toluene or equivalent aryl vinyl monomer reactive diluent serves as the medium, the epoxy resin composition and the bismaleimide resin composition both being soluble therein to provide a clear solution.

Briefly stated, this invention in its composition of matter aspect is a thermosetting resin having low viscosity at 25° C. and unique thermal stability which consists essentially of a bismaleimide resin composition, a reactive diluent, and an epoxy resin composition consisting essentially of 1, 2 epoxy resin having at least two epoxide groups per molecule, a small but effective amount of a phenolic accelerator and a labile halogen-free catalytic hardener.

In its article of manufacture aspect this invention, likewise briefly described, comprises an elongated conductor coated with a thermosetting resin composition as described above or, in the alternative, such a conductor wrapped with a tape impregnated with the thermosetting resin composition of this invention.

Finally, the method of this invention, as a matter of general definition, comprises the steps of providing an elongated conductor, covering the conductor with a coat of resin composition of this invention as described above and then thermally curing the thermosetting resin composition in situ on the conductor. Alternatively, as also indicated above, the method may comprise the steps of providing an elongated conductor and providing a tape for wrapping the conductor impregnating the tape with a resin composition of this invention wrapping the impregnated tape on the conductor and then thermally curing the resin composition in the tape in situ on the conductor.

DETAILED DESCRIPTION OF THE INVENTION

Figure 1:
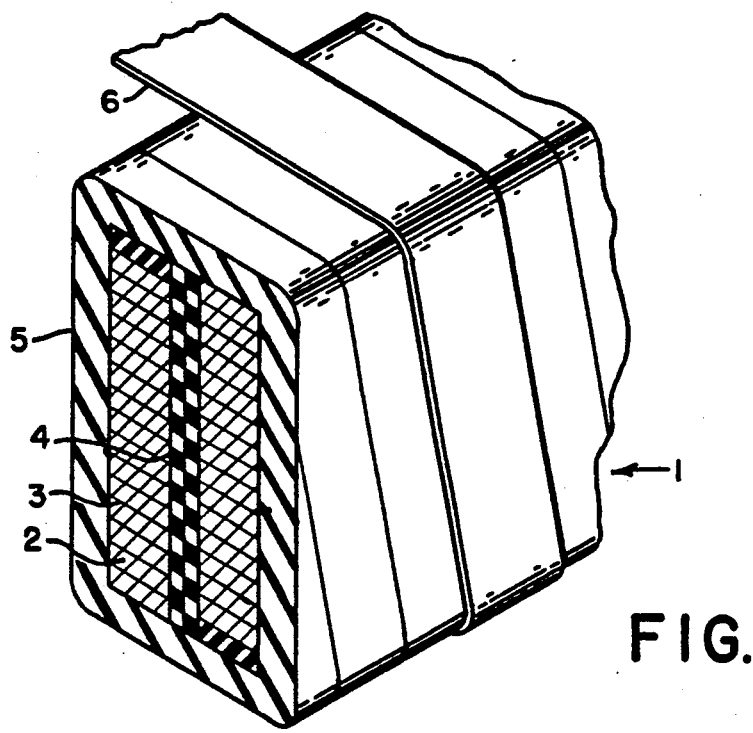
FIG. 1 is a fragmentary perspective view of an armature winding bar wrapped with ground insulation mica paper coated and impregnated or prepregged mica tape in accordance with this invention.

While one has a wide latitude of choice as to both the epoxy resin composition and the bismaleimide resin composition in practicing this invention, our present preference is to use as the epoxy resin composition that hereinafter identified Resin A, and to use as the bismaleimide resin composition that which is commercially available as a product of the Shell Chemical Company under the trade name "Compimide 353". The latter is a hot melt-type eutectic mixture of bismaleimide resins based on methylene dianiline and aliphatic diamines and has a melting point of 68° to 129° C. This particular maleimide resin composition is favored for this purpose because of its high solubility along with epoxy resin compositions at 70° to 100° C. in aryl vinyl monomer.

Resin A is a clear resin having viscosity of 470 centipoises (cps) at 25° C. and gel time of 8.0 minutes at 171° C. The method of its production and additional description of Resin A are set forth in Example 29 of the aforesaid −182 patent which is incorporated herein by reference.

Resin A and Compimide 353 are used in approximately equal proportions and vinyl toluene is added in an amount such that the proportion of vinyl toluene in the total resin composition of this invention is between approximately 25% and 40% for VPI applications and can contain as low as 5% aryl vinyl monomer for a prepregged mica tape. These materials are mixed and stored at approximately 80° C. until the mixture is substantially uniform throughout.

In accordance with this invention other bismaleimide resin compositions can be used and likewise the present new advantages and results can be obtained through the use of epoxy resin compositions other than Resin A. Thus, eutectic blends of an aliphatic bismaleimide and an aromatic bismaleimide, which as eutectics have melting points in the range of about 60° C. to about 130° C. and consequently are soluble with Resin A and the like in vinyl toluene or other such aryl vinyl monomer, are reasonable alternatives to the preferred compositions stated above.

Reactive diluents other than vinyl toluene are useful in the practice of this invention as previously indicated. While we prefer the latter, styrene, alpha-methyl styrene, an isomer or a mixture of isomers of vinyl toluene, of t-butyl styrene, of divinyl benzene, and of diisopropenyl benzene and mixtures thereof can be used. As used herein "vinyl toluene" refers to a mixture of the meta- and para-methyl styrene isomers, but a single isomer such as para-methyl styrene may be used, and similarly t-butyl styrene refers to para-t-butyl styrene or a mixture of the ortho, meta and para isomers. Divinyl benzene and diisoprophenyl benzene also refer to one isomer or mixtures of the ortho, meta and para isomers. Further, divinyl benzene may also contain a substantial quantity of ethyl vinyl benzene.

In preparing the present thermosetting resin compositions in accordance with our presently preferred mode, Resin A is compounded with vinyl toluene as described in Example 29 of the −182 patent. Compimide 353 is added in approximately equal portion to Resin A and vinyl toluene is added in amount to bring the total in the mixture to about 40%. Thus, our preference is for the upper end of the 25 to 40% range of vinyl toluene content of the thermosetting resin composition and for the lower end of the range of bismaleimide resin composition content at about 34%, the upper end of that range being about 43%. The mixture as thus compounded as stirred at approximately 80° C. until it is substantially uniform throughout.

As thus produced, the thermosetting resin composition of this invention can be employed in providing insulating coatings and coverings for electrical conductors, being applied by spraying, dipping or brushing them on a conductor surfaces in requisite thickness. The coatings are then cured to hard, tough solids by subjecting them to temperature of 160° C. for a suitable time, such as up to 15 hours. The thermosetting resin containing as low as 5% aryl vinyl monomer and having a higher viscosity than used in VPI processing may be used to impregnate a mica containing tape to form a prepregged or resin-rich mica tape which is wrapped around a conductor and then cured under heat and pressure to consolidate the insulation. Alternatively, these resins can be used in vacuum-pressure impregnation applications to fill glass fabric, mica paper or mica flake tapes or the like which have been wrapped around the conductors and assembled in the winding and then curing the impregnated composite resin material in situ by a heat curing operation as described above.

The resulting sheets or tapes can be wound by hand or by machine as ground or other insulation on electrical components such as a conductor bar shown in FIG. 1 of the drawings, accompanying this specification. Thus, a typical conductor bar 1 having a plurality of conductor turns 2 insulated from each other in the usual manner has arrays of conductors separated by strand separators 4. Wrapped around the armature winding bar is ground insulation 5 of a plurality of layers of mica paper tape 6, coated and impregnated with the resin composition of this invention. The wrapped conductors can be assembled in the machines and then vacuum-pressure impregnated with the resins of this invention followed by draining the excess resin and baking to cure the resin. Another process is to make a mica tape containing the solventless resin of this invention then wrapping the prepregged tape around the conductor. In preparing such an insulated conductor bar, the entire assembly is covered with a sacrifice tape and placed in a pressure tank and evacuated. There is no need in this process to remove solvents from the present resin compositions, the only purpose of the evacuation being to remove entrapped air. After vacuum treatment, molten bitumen, or other heat transmitting fluid is introduced into the tank under pressure to cure the resin in well known manner. Upon completion of the curing step, the insulated conductor is removed from the bath, cooled and the sacrifice tape is removed.

Figure 2:
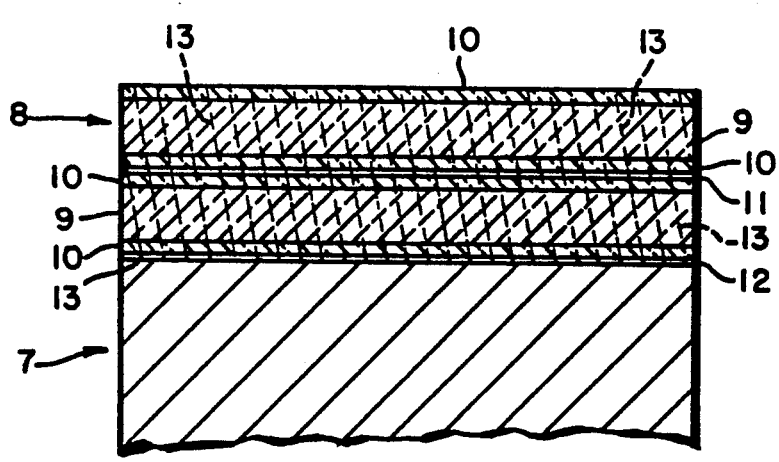
FIG. 2 is an enlarged, fragmentary, sectional view of an electrical conductor like that of FIG. 1 provided with vacuum-impregnated insulation in accordance with the present invention.

An enlarged, fragmentary, sectional view of an electrical conductor 7 is provided in FIG. 2, the conductor being provided with vacuum-impregnated insulation 8 according to this invention. Thus, there are two layers of mica paper 9 with reinforcement or backing material 10 and a small space 11 between these layers and another layer 12 between the inner tape layer and conductor 7. Spaces 11 and 12 and the tape layers themselves are filled by the resinous composition as depicted with cross-hatching indicated by reference character 13. Such complete filling of this insulating structure and the void free nature of the conductor covering are attributable to the low viscosity of the novel composition of this invention and to the fact that it contains no solvent to be removed during the curing operation.

Departures from our presently preferred practice described in detail above are contemplated and covered generally and specifically by the appended claims as the new results and advantages of this invention can be obtained consistently through the use of other bismaleimide resin compositions and epoxy resin compositions in similar thermosetting resin compositions. Thus, in regard to bismaleimide resin compositions, as those skilled in the art recognize, they are oligomers or bisimide monomers usually derived from maleic anhydride and aromatic diamines such as methylene dianiline. Aromatic amines and allyl phenols have been used as co-curing materials for the bismaleimide resins. An allyphenol used with bismaleimide resin is o-o'-diallyl bisphenol A. There are many such resins and a large number of those are suitable for use in accordance with this invention but again, Compimide 353 offers the special advantage of high solubility in epoxy resins to form epoxy-bismaleimide resin composition solutions.

Epoxy resins which are suitable for use in accordance with this invention include those which are disclosed and claimed in the aforesaid U.S. Pat. No. 4,603,182. In fact, they are detailed as to preparation and composition in the working examples set forth in that patent. Those portions of that patent pertaining to the epoxy resin compositions of the invention therein claimed are hereby incorporated in this disclosure by reference. Epoxy Resins specifically set forth in that −182 Patent are bisphenol A diglycidyl ether epoxy resins (such as those sold under the trademarks EPON 826 and EPON 828 by Shell Chemical Co.). Other liquid resins of this formulation (such as those marketed under the trademarks DER 330,331 and 332 by Dow Chemical Company, Epi-REz 508, 509 and 510 by Celanese Corporation and Araldite 6004, 6005 and 6010 by Ciba-Geigy). Still other suitable resins of this type are epoxy novolac resins (such as DEN 431 and DEN 438 of Dow Chemical Company and Epi-Rez SU-2.5 of Celenese Corp.), halogenated epoxy resins (such as Araldite 8061 of Ciba-Geigy) and cycloaliphatic epoxy reins (such as ERL 4206, 4221E 4234, 4090 and 4289 of Union Carbide and Araldite CY182 and 183 of Ciba-Geigy). All these epoxy resins are nitrogen free.

Those skilled in the art will gain a further and better understanding of the present invention and the new results and advantages thereof in the following illustrative, but not limiting, examples of the practice of this invention as it has actually been carried out experimentally.

EXAMPLE 1

A clear amber, 4,500 Centipoises viscosity at 25° C. resin was obtained by heating at 70° C. and stirring 50.00 parts-by-weight (pbw) of Resin A, 16.7 pbw vinyl toluene, and 50.0 pbw of Compimide 353 resin. This resin contains 25 percentage by weight vinyl toluene, identical to the 25% by weight of Resin A. The weight losses at 260°, 280° and 300° C. were significantly lower with the Compimide 353 modified resin than Resin A when tested together and under identical test conditions. Weight loss measurements were made on 10-gram, 2.1-inch diameter discs which were aged in forced air circulating ovens. The Resin A control sample was tested together with the new resin, therefore, comparisons in this experiment and those following below were made of materials that saw identical time and temperature test conditions.

| | % Weight Loss | |
|---|---|---|
| | Resin A | Example 1 |
| 21 days @ 260° C. | 8.68 | 4.81 |
| 21 days @ 280° C. | 14.41 | 7.41 |
| 10 days @ 300° C. | 25.32 | 8.72 |

In addition, while the aged Resin A samples showed extensive surface cracks and embrittlement, the Example 1 resin samples were tough, glossy solids with no surface cracks or other signs of thermal deterioration.

EXAMPLE 2

A clear, 2,500 Centipoises viscosity @ 25° C. resin was made by stirring and heating at 70° C. 50.0 pbw of Resin A, 20.7 pbw vinyl toluene and 50.0 pbw Compimide 353. The resin was significantly more heat stable than Resin A.

| | % Weight Loss | |
|---|---|---|
| | Resin A | Example 2 |
| 21 days @ 260° C. | 8.68 | 4.57 |
| 21 days @ 280° C. | 14.41 | 6.91 |
| 10 days @ 300° C. | 25.32 | 8.15 |

The heat aged Example 2 resin samples had no cracks or other signs of thermal deterioration compared to the extensive surface cracking and embrittlement of Resin A during the 280° and 300° C. aging.

EXAMPLE 3

A clear, 1,800 Centipoises @ 25° C. resin was made from Resin A (50.0 pbw), vinyl toluene (25.0 pbw) and Compimide 353 resin (50.0 pbw) by heating and stirring at 70° C. The resin was significantly more heat stable than Resin A:

| | % Weight Loss | |
|---|---|---|
| | Resin A | Example 3 |
| 21 days @ 260° C. | 8.68 | 4.39 |
| 21 days @ 280° C. | 14.41 | 6.91 |
| 10 days @ 300° C. | 25.32 | 8.15 |

Unlike the Resin A, the Example 3 resin samples remained tough solids with no formation of surface cracks after the heat aging at 280° and 300° C.

EXAMPLE 4

A 1,000 Centipoises @ 25° C. resin was made from Resin A (50.0 pbw), vinyl toluene (29.6 pbw) and Compimide 353 resin (50.0 pbw) by heating and stirring at 70° C. The heat stability of this resin was significantly better than that of Resin A.

| | % Weight Loss | |
|---|---|---|
| | Resin A | Example 4 |
| 21 days @ 260° C. | 8.68 | 4.34 |
| 21 days @ 280° C. | 14.41 | 6.84 |
| 10 days @ 300° C. | 25.32 | 8.08 |

As in Examples 1 to 3, the Example 4 resin remained a tough solid with no formation of surface cracks or other signs of thermal deterioration.

EXAMPLE 5

A 320 Centipoises @ 25° C. resin was made from Resin A (50.0 pbw), vinyl toluene (34.6 pbw), and Compimide 353 resin (50.0 pbw). The resin was significantly more heat stable than Resin A.

| | % Weight Loss | |
|---|---|---|
| | Resin A | Example 5 |
| 14 days @ 260° C. | 7.14 | 3.59 |
| 14 days @ 280° C. | 12.55 | 5.85 |
| 7 days @ 300° C. | 15.15 | 6.94 |

The extensive cracking and embrittlement of the Resin A samples ages at 280° and 300° C. were not present in the Example 5 resin samples.

EXAMPLE 6

A 200 Centipoises @ 25° C. viscosity resin was made from Resin A (50.0 pbw), vinyl toluene (40.0 pbw), and Compimide 353 resin (50.0 pbw). The resin was significantly more heat stable than Resin A.

|  | % Weight Loss | |
| --- | --- | --- |
|  | Resin A | Example 6 |
| 14 days @ 260° C. | 7.14 | 3.44 |
| 14 days @ 280° C. | 12.55 | 5.67 |
| 7 days @ 300° C. | 15.15 | 6.76 |

Unlike the Resin A, no cracks or embrittlement occurred in the Example 6 resin samples.

EXAMPLE 7

A 100 Centipoises @ 25° C. resin was made by heating at 80C. and stirring Resin A (50.0 pbw), vinyl toluene (45.8 pbw), and Compimide 353 resin (50.0 pbw). This resin was significantly more heat stable than Resin A.

|  | % Weight Loss | |
| --- | --- | --- |
|  | Resin A | Example 7 |
| 14 days @ 260° C. | 7.14 | 3.33 |
| 14 days @ 280° C. | 12.55 | 5.52 |
| 7 days @ 300° C. | 15.15 | 6.64 |

The cracking and embrittlement of Resin A aged at 280 and 300° C. were not present in the Example 7 resin samples. Those skilled in the art will understand that there are possible applications of this new chemistry in addition to vacuum-pressure impregnation resins and resins for making electrical insulation prepregs, and that those applications include thermosetting resins for production of heat resistant resin-glass laminations, coating molding and potting compounds, adhesives, tooling composites based on glass carbon fibers and other reinforcements and the like.

In this specification and the appended claims, where percentage, proportion or ratio is state, reference is to the weight basis unless otherwise specified.

We claim:

1. A solventless, vacuum-pressure impregnatable thermosetting resin composition having viscosity less than 4,500 cps at 25° C. and unique thermal stability consisting essentially of
   (a) an epoxy resin composition consisting essentially of a nitrogen-free 1,2 epoxy resin having a least two epoxide groups per molecule, a small but effective amount of a phenolic accelerator and a labile halogen-free cationic catalytic hardener selected from the group consisting of a metal acetylacetonate and an organic titanate in an amount on the basis of the epoxy resin between 0.1 and 15% of the acetylacetonate and between 0.025 and 10% of the organic titanate;
   (b) a bismaleimaide resin composition; and,
   (c) aryl vinyl monomer as reactive diluent.

2. The resin composition of claim 1 in which the bismaleimide resin composition has a melting point of about 60° C. to about 130° C., and in which the bismaleimide resin composition content of the thermosetting resin composition is between about 25% and about 50%, said resin composition having viscosity at 25° C. from about 100 to about 4500 centipoises.

3. The resin composition of claim 1 in which the bismaleimide resin composition is a hot melt-type eutectic mixture of bismaleimide resins based on methylene dianiline and aliphatic diamines and has a melting point of 68° C. to 129° C.

4. The resin composition of claim 1 in which the reactive diluent is vinyl toluene, and in which the vinyl toluene, and in which the vinyl toluene content of the thermosetting resin composition and the bismaleimide content thereof are, respectively, between about 5% and 45% and between about 50% and 25%, said resin composition having viscosity less than about 2000 centipoises at 25° C.

5. The resin composition of claim 1 in which the catalytic hardener is a metal acetylacetonate selected from the group consisting of aluminum acetylacetonate, zirconium acetylacetonate, titanium acetylacetonate and mixtures thereof.

6. The resin composition of claim 1 in which the cationic catalytic hardener is an organic titanate selected from the group consisting of tetraoctylene glycol titanate, tetrabutyl titanate and mixtures thereof.

7. The resin composition of claim 1 in which the phenolic accelerator is selected from the group consisting of catechol, resorcinol, phenol novolac resin and mixtures thereof.

8. The resin composition of claim 1 in which the reactive diluent is vinyl toluene, the cationic catalytic hardener is a metal acetylacetonate selected the group consisting of aluminum acetylacetonate, zirconium acetylacetonate, titanium acetylacetonate and mixtures thereof, and the phenolic accelerator is selected from the group consisting of catechol, resorcinol, phenol novolac resin and mixtures thereof.

9. The resin composition of claim 2 in which the reactive diluent is vinyl toluene, the cationic catalytic hardener is an organic titanate, selected from the group consisting of tetraoctylene glyco titanate, tetrabutyl titanate and mixtures thereof, and the phenolic accelerator is selected from the group consisting of catechol, resorcinol, phenol novolac resin and mixtures thereof.

10. The resin composition of claim 2 containing between about 25% and 40% vinyl toluene.

11. The resin composition of claim 1 in which the reactive diluent is vinyl toluene and the vinyl toluene content of the composition is about 40%.

* * * * *